Oct. 7, 1969   P. V. GREGG   3,470,724
PIPE END FORMING MACHINE
Filed Dec. 28, 1967   2 Sheets-Sheet 1
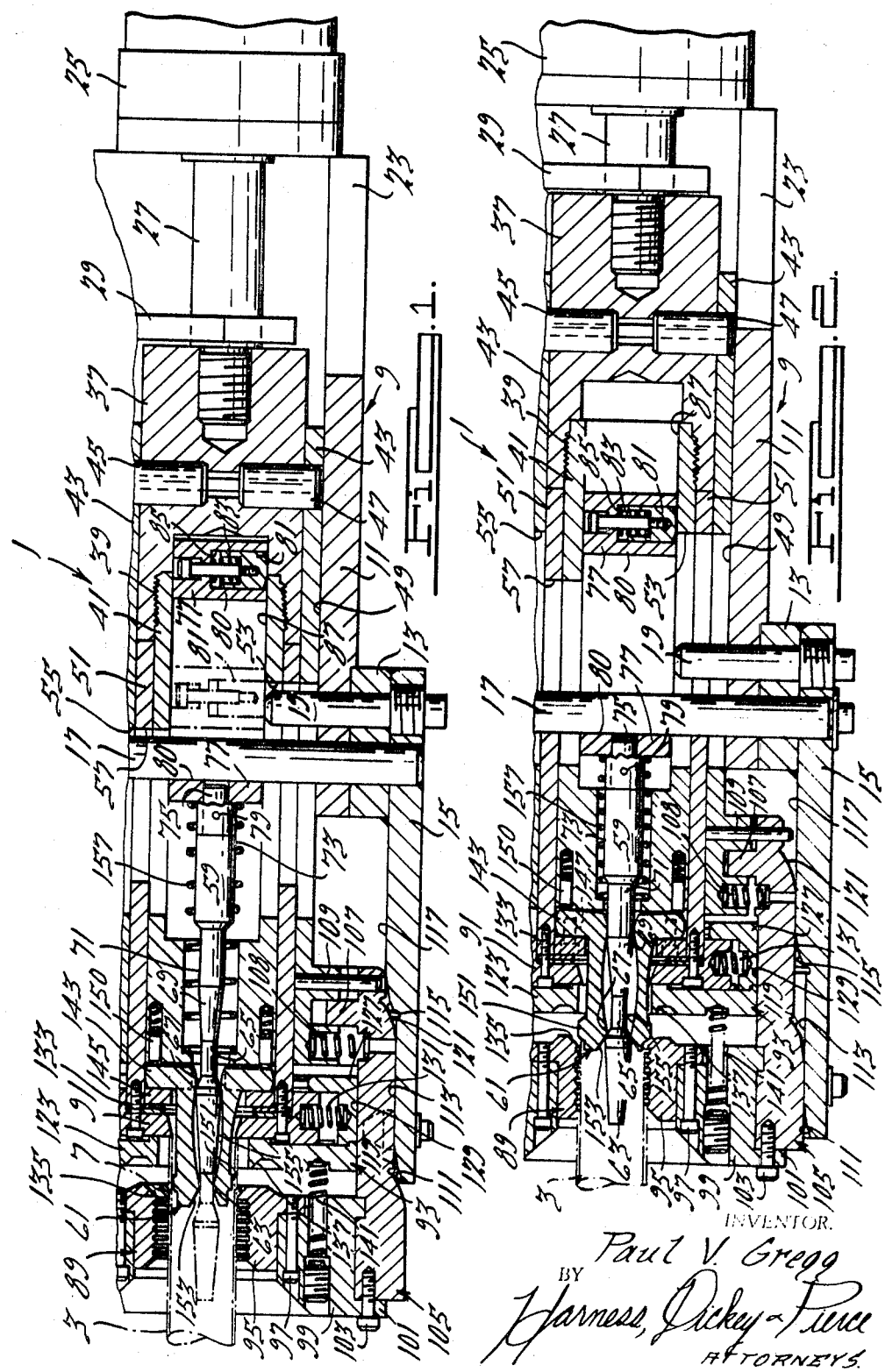
INVENTOR.
Paul V. Gregg
BY Harness, Dickey & Pierce
ATTORNEYS.

Oct. 7, 1969  P. V. GREGG  3,470,724
PIPE END FORMING MACHINE
Filed Dec. 28, 1967  2 Sheets-Sheet 2
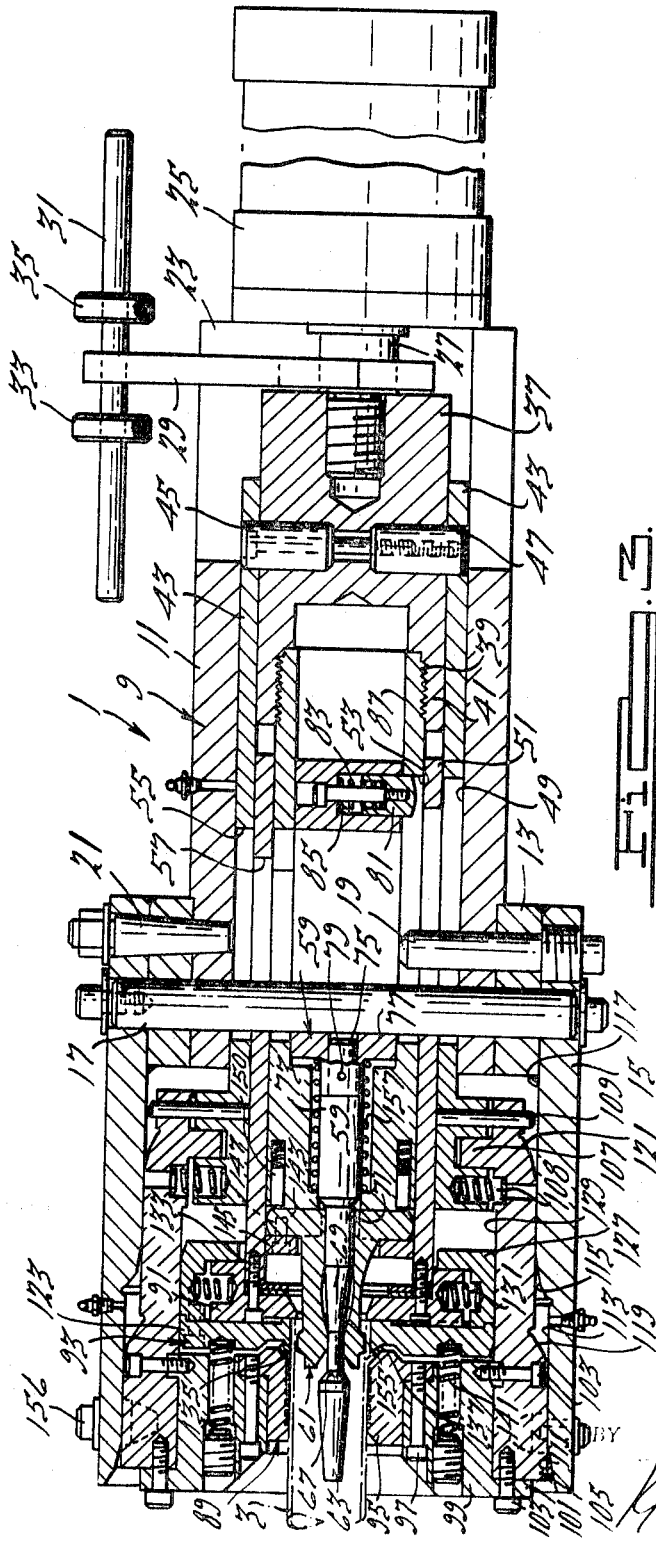
INVENTOR.
Paul V. Gregg
BY Harness, Dickey-Pierce
ATTORNEYS.

United States Patent Office 3,470,724
Patented Oct. 7, 1969

3,470,724
PIPE END FORMING MACHINE
Paul V. Gregg, Racine, Wis., assignor to Walker Manufacturing Company, Racine, Wis., a corporation of Delaware
Filed Dec. 28, 1967, Ser. No. 694,193
Int. Cl. B21d 11/04, 41/02; B21j 9/18
U.S. Cl. 72—306                          12 Claims

ABSTRACT OF THE DISCLOSURE

A machine for forming the end of a tube or pipe has holding or sizing collets which are movable radially inwardly to engage the outer surface of the end of the pipe. Internal collets are positioned inside of the tube end and can be expanded to form a bubble or internal recess on the tube wall. The internal collets and the work-holding collets are attached to connected sleeve slides so that they move together with the ram of a double acting hydraulic cylinder. Another sleeve carries radially movable collets which when in operative position coact with faces on the work-holding collets to form a flange of desired shape out of the annular recess.

RELATED APPLICATIONS

This application is related to my copending application Ser. No. 451,898, filed Apr. 29, 1965, and now U.S. Patent 3,393,549, and also to U.S. Patent 3,338,082 and U.S. Ser. No. 447,730, filed Apr. 13, 1965, and now U.S. Patent 3,362,212, assigned to the present assignee.

BRIEF SUMMARY OF THE INVENTION

The invention concerns a mechanical apparatus that may be used in production to form relatively complicated shapes in the end of a tube such as an automobile tail pipe or exhaust pipe. The mechanism is such that it can be operated by one acting hydraulic cylinder and may receive different sets of collets and tooling to perform different operations on the end of the tube. It includes means for longitudinally positioning both internal and external collets to hold or deform the wall of the tube and means for operating additional collets in order to further hold or deform the tube.

DESCRIPTION OF THE DRAWINGS

FIGURE 1 is a longitudinal cross section (partly broken away) through a machine embodying the invention and shows the machine ready to begin a cycle of operation;

FIGURE 2 is the cross section of FIG. 1 but shows the machine in the condition wherein the internal collets are performing an expanding operation; and FIGURE 3 is the cross section of FIG. 1 but shows the machine performing the flanging operation.

DESCRIPTION OF THE INVENTION

The end forming machine 1 which is illustrated in the drawings is constructed to handle a pipe or tube 3 and form in it an annular bubble or outwardly extending embossment 5 and then upset this into a U-shaped fold forming a flange 7 in the wall of the tube 3. In doing this the machine 1 performs three separate operations (holding, bubbling, and flanging) and it will be understood that it can be readily modified without departing from the invention to substitute various other operations such as sizing, swaging, flaring, etc., for one or more of the three inasmuch as these operations involve merely the replacement of one form of known tool or collet set for another in the basic construction of the machine 1.

The machine 1 has a frame 9 which is fixed in position on the floor or work-table (not shown) in a suitable or conventional manner. The frame 9 includes a slide housing 11 which is connected through a ring 13 to a larger diameter cam ring 15. At the joint between the housing sections 11 and 15 and extending through the ring 13 are a cross pin 17, a release pin 19, and a tapered connecting pin 21. Secured in a suitable manner to the end 23 of the housing section 11 is a hydraulic cylinder 25 of the conventional commercial type having a longitudinally movable ram 27. Clamped to the ram 27 is a bracket 29 (FIG. 3) which carries a transverse pin 31 on which are adjustably mounted the dogs 33 and 35. The dogs are intended to engage and operate suitable limit switches (not shown) for actuating a conventional electro hydraulic circuit to operate and control the ram 27 in accordance with the requirements of the machine 1.

The ram 27 is threaded into the end of a connector block 37 which in turn is threaded at 39 onto the end of a closing sleeve 41. The connector block 37 is also secured to an outer sleeve 43 by means of transverse connecting pins 45 and 47. Thus, the ram 27 and the sleeves 41 and 43 move together as a unit in the longitudinal direction to the left and to the right in the drawing with the sleeve 43 riding in a bore 49 in the housing section 11.

The sleeves 41 and 43 are radially spaced from each other and located between them in this space and slidably longitudinally relative to them is a closing sleeve 51. The three longitudinally movable sleeves 41, 43, and 51 all extend on both longitudinal sides of the cross pin 17 and the release pin 19, both of which are fixed in longitudinal position. Accordingly, the sleeves 41, 43, and 51 have longitudinally extending diametrically opposed slots 53, 55 and 57, respectively, formed in their walls to enable the sleeves to slide back and forth relative to the pins.

Located inside of the bubbling sleeve 41 is an arbor 59 for operating the set of bubble-forming collets 61. The arbor has a tapered nose section 63 (FIG. 3) which is joined to a uniform diameter section 65 by a tapered section 67. A slightly tapered section 69 joins the uniform diameter section 65 to a larger uniform diameter section 71 which in turn is joined to a still larger uniform diameter section 73. The section 73 has a reduced end 75 which fits inside of a reduced end on an enlarged bearing sleeve section 77 of the arbor and connected to it rigidly by cross pin 79. The bearing section 77 slides inside of the sleeve 41 and has transverse slots 80 in it for passage across the cross pin 17. At the ram end of the arbor bearing sleeve section 77 there is housed a radially extending lock pin 81 which is pressed outwardly by a spring 83 housed in an aperture 85 in the arbor 59. The rounded nose of the lock pin 81 may ride on the surface of the bearing sleeve receiving bore 87 in the sleeve 41 but, as shown in FIG. 3, it may also expand into the slot 53 of the sleeve 41 so that movement of the sleeve 41 to the left will also move the pin 81 and the arbor 59 to the left. However, as seen in the phantom lines in FIG. 1, the end of the release pin 19 is located on the diameter of surface 87 and serves to cam the lock pin 81 back into the bore 87 when the longitudinal position of the arbor 59 is such that the lock pin 81 and release pin 19 are radially aligned.

The sleeve 41 carries at its left end and controls the longitudinal position of the bubbling collets 61. The sleeve 43 carries at its left end and controls the longitudinal position of the holding collets 89. Since the sleeves 41 and 43 are connected together for joint longitudinal movement the holding collets 89 and the bubbling collets 61 are longitudinally fixed with respect to each other. The closing sleeve 51 carries at its left end a closing ring 91 which has a radial face on its left side that serves as a stop to position the end of the tube 3 when it is inserted in the machine 1. Also carried by the sleeve 51 are the closing collets 93.

The tube holding collets 89 are several in number and each comprise an arcuate section spring separated from adjacent collets so that altogether they encircle the tube and are urged to expanded condition. Tube holding collets are well known in the art and are illustrated in a general manner in my copending application Ser. No. 451,898, filed Apr. 29, 1965. The collets 89 include a number of parts commencing with the inserts 95 which collectively actually engage the surface of the tube 3. The inserts 95 have flanges by means of which they are connected through cap screws 97 to the collet holder elements 99 and these in turn are connected by cap screws 103 to the collet cams 105. The collet cams also have flanges 107 which fit in radial grooves in the left end of the outer sleeve 43 and are urged to expanded position by springs 108. Guide pins 109 projecting from the sleeve 43 insure true radial movement of the collet cams 105.

The cam sleeve 15 of the machine housing 9 has a tapered end surface 111 which is joined by a cylindrical surface 113 to a tapered surface 115 which merges into the inner diameter 117 of the sleeve 15. As seen by comparing FIGS. 1 and 2, movement of the outer sleeve 43 to the right carries the assembly of collets 89 to the right so that the cam surfaces 119 and 121 on the collet cams 105 engage the cam surfaces 111 and 115, respectively, on the cam sleeve 15 to cause inward radial movement of the assembly of collet members so that they grip the outer surface of the tube 3. It is apparent that by properly sizing the collets they could be made to reduce the diameter of the end of the tube 3, if that were desired, although in the present arrangement mere holding or gripping of the tube is achieved.

When the collet cams 105 are moved in an inward radial direction, as just described, they also move the closing collet assembly 93 in an inward radial direction. The closing collet assembly 93 comprises a series of plate-like and tube engaging collet members 123 which are connected by cap screws 125 to the collet retainers 127 that are pressed against the inner diameter 129 of the collet cams 105 by springs 131 that seat in suitable apertures in the outer periphery of the closing ring 91 which is secured by cap screws 133 to the end of the closing sleeve 51.

The holding collet inserts 95 have conical surfaces 135 (FIG. 2) which are aligned with and coact with the conical surfaces 137 on the outer radial face of the closing collets 123. Springs 141 which are based in the holder collets 99 press against the closing collets 123 and act to yieldably hold them and connected parts away from each other.

The bubbling collets 61 each have a radial flange 143 (FIG. 3) which is received in appropriate radial slots formed in the end of the bubbling sleeve 41 and are held therein by means of a retainer ring 145 which is secured by cap screws 147 to the end of the sleeve 41. The collets 61 can rock to some extent about their heels 149 and are urged to move toward an inward position by means of spring pressed pins 149 in the sleeve 41 which act against the flanges 143. The bubbling collets 61 have bubbling projections 151 which expand against the tube and form the bubble 5 as seen in FIGURE 2. The outer ends of the collets 61 are conical on the inside as seen at 153 (FIG. 2) for cam engagement with the cam surfaces 63 and 67 on the arbor 59. The inner diameter of the collets 61 is curved, as seen at 155 to permit ready collapse of the collets on the section 65 of the arbor 59. Guide pins 156 hold the collets 89 in correct angular position.

In operation, FIG. 1 illustrates the load position of the machine when the operator inserts the tube 3 until it abuts the ring 91 whereupon he trips a foot switch (not shown) to actuate the electrical and hydraulic control mechanism (not shown) for furnishing hydraulic fluid under pressure to the cylinder 25. In the first stage of operation, the ram 27 moves from the position of FIG. 1 to that of FIG. 2 and this pulls the outer sleeve 43 to the right which causes the holding collets 89 to move longitudinally inside the cam ring 15 so that they are cammed radially inwardly to grip the outside of the tube 3. The collets 89 are spaced away from the closing collets 93 as can be seen in FIGS. 1 and 2. Near the end of the stroke from FIG. 1 to FIG. 2 the bubbling collets 61, which are moved longitudinally with the ram by the sleeve 41, ride along the conical arbor surface 63 so that the projections 151 are forced outwardly to form an annular ring or bubble in the wall of the tube 3 as seen at 5. This bubble is formed in the space between the work-holding collets 89 and the closing collets 93. The arbor 59 is held in fixed position during the movement of the sleeves 41 and 43 by abutment with the fixed cross pin 17. Further movement of the ram 27 to the right enables the bubble collets 61 to come into radial alignment with the small diameter section 65 of the arbor 59 and they can therefore collapse to a minimum diameter position as seen in FIG. 3. As the parts move to the right, the closing sleeve 53 abuts against the cross pin 17 so that the longitudinal position of the closing collets 93 is fixed, this occurring as seen in FIG. 2 even before the bubbling collets 61 have collapsed. The bubble or ring 5 that is left when the collets 61 collapse is in alignment with the conical sections 135 and 137 on the collet inserts 95 and the closing collet sections 123. Further movement of the ram 27 from the position of FIG. 2 to that of FIG. 3 therefore upsets or collapses the ring 5 in the tube since the collet 89 continues to move to the right to close the space between surfaces 135 and 137. The ring 5 is therefore pinched into the U-shaped folded flange 7, as seen in FIG. 3.

At the end of the flange-forming stroke of FIG. 3, the sleeve 41 has moved far enough to the right relative to the arbor 59 which is held in position by cross pin 17 so that the lock pin 81 expands into the slot 53 of the sleeve 41. At this point the ram 27 is reversed in direction and commences to move to the left and when it does the arbor 59 also moves to the left because of the lock pin contact with the sleeve 41. This therefore maintains the bubble collets 61 in the collapsed condition over the diameter 65 of the arbor 59 and this condition persists until the parts return to the position of FIG. 1 with the arbor in the dotted line position of FIG. 1. The control mechanism is such as to provide a slight pause or stop just before reaching the dotted line position of FIG. 1 so as to permit removal of the tube 3 before the lock pin 81 rides over the release pin 19 as seen in dotted lines in FIG. 1. The forward movement then continues to the left and a lock pin is cammed back onto the surface 87 by the release pin 19 whereupon the spring 157 which engages the arbor at one end and the sleeve 41 at the other end forces the arbor 59 back against the cross pin 17 (full lines in FIG. 1) so that the apparatus has completed a cycle and another tube can be inserted.

It will be recognized that one cylinder 25 is used to perform external holding, internal expanding, and longitudinal upsetting (including radial positioning) operations on the end of the tube, all during movement of the ram in one direction, the parts being returned to the receive position and formed tube being removed during the return stroke. It is apparent that the radial movement of collets 93 could be used to perform a fourth operation on the tube if desired and that additional radially inwardly movable collets for additional operations could be inserted and operated by the same cam means.

Modifications may be made in the structure described without departing from the spirit and scope of this invention.

I claim:

1. A machine for performing at least three operations on the end of a tube comprising first forming tool means for applying an inward radial pressure to the tube end, second forming tool means for applying an outward radial pressure to the tube end, third forming tool means for applying a longitudinal pressure to the tube end, cam means for applying an inward radial force to the first tool means and an outward radial force to the second tool means, a hydraulic cylinder having a longitudinally movable ram, and connection means operatively connecting the ram to the cam means and to each of the tool means.

2. A machine as set forth in claim 1 wherein said cam means applies an inward radial force to said third tool means to position it with respect to a tube.

3. A machine as set forth in claim 1 including a housing having a cam sleeve fixed in longitudinal position, said cam means including a collet cam engageable with the housing cam sleeve and movable radially to apply pressure to both the first and second tool means.

4. A machine as set forth in claim 1 wherein said connection means includes a first sleeve interconnecting the ram and the first tool means, a second sleeve interconnecting the ram and the second tool means, and a third sleeve for connection to the ram and carrying the third tool means, said first and second sleeves having fixed longitudinal positions relative to each other and being longitudinally movable with respect to the third sleeve.

5. A machine as set forth in claim 4 including an arbor inside of said sleeves and positioned to coact with the second tool means and forming a part of said cam means.

6. A machine as set forth in claim 5 including a latch pin for connecting the arbor to said first and second sleeves at the conclusion of operation of the three tool means.

7. A machine as set forth in claim 6 including a release pin for disengaging the latch pin from the first and second sleeves.

8. A machine as set forth in claim 7 including a housing and abutment means in the housing for engagement with the arbor and the third sleeve to fix the position thereof during operation of the second and third tool means.

9. A machine as set forth in claim 1 wherein said fir tool means is longitudinally movable by said ram relati to the third tool means and includes a work deformii surface cooperative with a work deforming surface c the third tool means.

10. A machine as set forth in claim 1 including housing having a cam ring that is fixed in longitudin position, said first and third tool means including radial movable collets, said cam means including radially mo able cam segments bearing against said first and secor tool means collets and movable longitudinally by sa ram in said cam ring to provide radial force on the fir and second tool means.

11. A machine as set forth in claim 1 including housing, means for connecting the third tool means 1 a portion of the housing to fix the longitudinal positic thereof, said first and third tool means having cooperatir surfaces adapted to engage and deform a radial pr( jection on the tube, said first tool means being movab by said ram toward the third tool means to apply workir pressure to said tube portion.

12. A machine for performing operations on the er of a tube comprising a housing having a fixed cai ring with cam surfaces on the interior thereof, a pluralil of longitudinally separated sets of radially inwardly mo able tube engaging collets in said housing, a commc radially movable cam member operatively engaging eac of said sets of collets and having cam surfaces engag( able with the cam surfaces of the cam ring, a hydrauli cylinder having a ram, and means connecting the rai to the common cam member to longitudinally move relative to the cam ring to cause radial movement of th cam member and collets.

References Cited

UNITED STATES PATENTS

| 3,263,476 | 8/1966 | Hinderer | 72—31 |
| 3,338,082 | 8/1967 | Steele et al. | 72—30 |
| 3,362,212 | 1/1968 | Steele et al. | 72—40 |
| 3,393,549 | 7/1968 | Gregg | 72—31 |

RONALD D. GREFE, Primary Examiner

U.S. Cl. X.R.

72—315, 393, 403, 452